United States Patent
Gzara et al.

(10) Patent No.: US 8,711,655 B2
(45) Date of Patent: Apr. 29, 2014

(54) SINGLE WELL RESERVOIR CHARACTERIZATION APPARATUS AND METHODS

(75) Inventors: Kais Gzara, Tunis (TN); Kamal Babour, Bures sur Yvette (FR); Michael Wilt, Abu Dhabi (AE); Ahmed El-Banbi, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 976 days.

(21) Appl. No.: 12/405,365

(22) Filed: Mar. 17, 2009

(65) Prior Publication Data

US 2010/0238763 A1 Sep. 23, 2010

(51) Int. Cl.
*G01V 1/40* (2006.01)
*G01V 1/44* (2006.01)
*G01V 1/52* (2006.01)

(52) U.S. Cl.
CPC ... *G01V 1/44* (2013.01); *G01V 1/40* (2013.01); *G01V 1/52* (2013.01)
USPC .......................................................... 367/25

(58) Field of Classification Search
CPC ........... G01V 1/44; G01V 1/52; G01V 1/168; G01V 1/047; G01V 1/66
USPC ............... 166/65.1, 66, 189, 208, 242.1, 315, 166/350.01; 175/57, 320; 181/102, 104, 181/108, 122; 285/3, 23, 39; 324/338; 367/25, 83, 911; 403/2, 3, 12; 340/853.1, 853.4, 856.1, 856.2, 855.1
See application file for complete search history.

(56) References Cited

U.S. PATENT DOCUMENTS

| | | | |
|---|---|---|---|
| 2,357,177 A | 8/1944 | Doll | |
| 2,357,178 A | 8/1944 | Doll | |
| 4,248,307 A * | 2/1981 | Silberman et al. | 166/374 |
| 4,578,785 A | 3/1986 | Gelfand | |
| 4,700,778 A | 10/1987 | Smith et al. | |
| 4,799,546 A | 1/1989 | Hensley et al. | |
| 5,058,683 A | 10/1991 | Godfrey | |
| 5,113,379 A * | 5/1992 | Scherbatskoy | 367/83 |

(Continued)

FOREIGN PATENT DOCUMENTS

WO 01/33032 A1 5/2001
WO 2008/024809 A1 2/2008

OTHER PUBLICATIONS

Alumbaugh et al., "A numerical sensitivity study of three dimensional imaging from a single borehole," Petrophysics, Jan.-Feb. 2001, vol. 42(1): pp. 19-31.

(Continued)

*Primary Examiner* — Isam Alsomiri
*Assistant Examiner* — Daniel L Murphy
(74) *Attorney, Agent, or Firm* — Bridget Laffey; Jakub M. Michna

(57) ABSTRACT

An apparatus and a method for characterizing parts of a reservoir surrounding a borehole are provided including using at least one transmitter to emit a probing signal into the borehole and at least one receiver to receive a signal representing a response of the formation to the probing signal, with the distance separating the transmitter and the receiver being variable while suspended in the borehole using for example an apparatus which can be decoupled in the borehole into a stationary and a mobile section, carrying transmitter and receiver.

15 Claims, 3 Drawing Sheets

(56) References Cited

U.S. PATENT DOCUMENTS

| | | | |
|---|---|---|---|
| 5,212,354 | A | 5/1993 | Miller et al. |
| 5,259,452 | A | 11/1993 | Wittrisch |
| 5,521,337 | A * | 5/1996 | Chen et al. ............... 181/102 |
| 5,967,816 | A | 10/1999 | Sampa et al. |
| 6,179,055 | B1 | 1/2001 | Sallwasser et al. |
| 6,209,648 | B1 | 4/2001 | Ohmer et al. |
| 6,315,043 | B1 | 11/2001 | Farrant et al. |
| 6,393,363 | B1 | 5/2002 | Wilt et al. |
| 6,439,932 | B1 | 8/2002 | Ripolone |
| 6,510,899 | B1 | 1/2003 | Sheiretov et al. |
| 6,538,447 | B2 | 3/2003 | Bittar |
| 6,776,636 | B1 | 8/2004 | Cameron et al. |
| 6,866,306 | B2 | 3/2005 | Boyle et al. |
| 6,956,790 | B2 | 10/2005 | Haldorsen |
| 7,048,089 | B2 | 5/2006 | West et al. |
| 7,116,199 | B2 | 10/2006 | Hall et al. |
| 7,331,386 | B2 | 2/2008 | Kanayama et al. |
| 7,408,355 | B1 | 8/2008 | Forgang et al. |
| 7,516,782 | B2 | 4/2009 | Sheiretov et al. |
| 7,825,664 | B2 | 11/2010 | Homan et al. |
| 2002/0014334 | A1 * | 2/2002 | Chau et al. ............... 166/65.1 |
| 2004/0035634 | A1 * | 2/2004 | Rueter ............... 181/122 |
| 2007/0137854 | A1 * | 6/2007 | Homan et al. ............... 166/66 |

OTHER PUBLICATIONS

Alumbaugh et al., "Theoretical and practical considerations for crosswell electromagnetic tomography assuming a cylindrical geometry," Geophysics, May-Jun. 1995, vol. 60(3): pp. 846-870.

Alumbaugh et al., "Three-dimensional massively parallel electromagnetic inversion—II. Analysis of a crosswell electromagnetic experiment," Geophysics Journal Int, 1997, vol. 128: pp. 355-363.

Alumbaugh et al., "Three-dimensional wideband electromagnetic modeling on massively parallel computers," Radio Science, Jan.-Feb. 1996, vol. 31(1): pp. 1-23.

Nabighian, "Chapter II Drill-Hole Electromagnetic Methods," Electromagnetic methods in applied geophysics—applications Part A and Part B, Society of Exploration Geophysics, Oklahoma, 1987: pp. 881-930.

Newman et al., "Three-dimensional massively parallel electromagnetic inversion—I. Theory", Geophysics Journal Int, 1997, vol. 128: pp. 345-354.

Wiggett, Development of an Extended Logging Tool for Geothermal Exploration and Field Development, California Energy Generation Research Office, Completed 2002: pp. 1-2, <http://www.energy.ca.gov/pier/portfolio/Content/Completed97to06/Completedprior05plusEISG05/Development%20of%20an%20Extended.htm,> accessed Feb. 3, 2012.

Wilt et al., "3D Extended logging for geothermal resources: field trials with the geo-bilt system," Proceedings, Twenty-Seventh Workshop on Geothermal Reservoir Engineering, Stanford University, Jan. 2002: pp. 1-9.

Wilt et al., "Crosshole electromagnetic tomography: A new technology for oil field characterization," The Leading Edge, Mar. 1995: pp. 173-177.

Wilt et al., "Crosswell electromagnetic tomography: System design considerations and field results," Geophysics, May-Jun. 1995, vol. 60(3): pp. 871-885.

Wilt, "Development of an Extended Logging Tool for Geothermal Exploration and Field Development," State of California Public Interest Energy Research (PIER) Project # 500-97-034, Mar. 2002: pp. 1-57.

Wilt et al., "Electromagnetic methods for development and production: State of the art," The Leading Edge, Apr. 1997: pp. 487-490.

International Search Report of PCT Application Serial No. PCT/US2010/027146 dated Sep. 29, 2010.

* cited by examiner

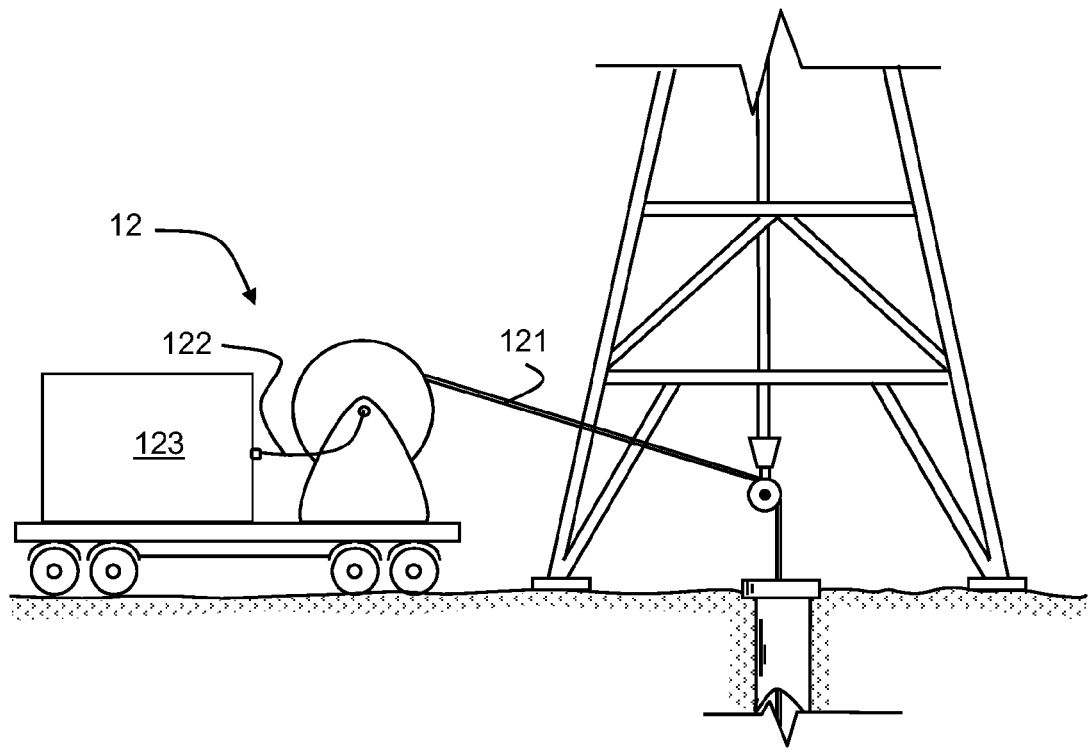
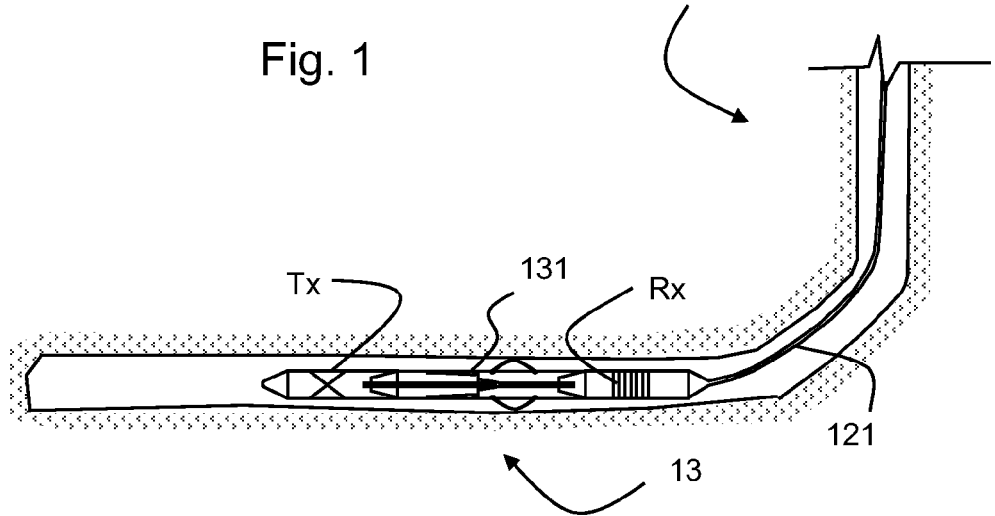
Fig. 1

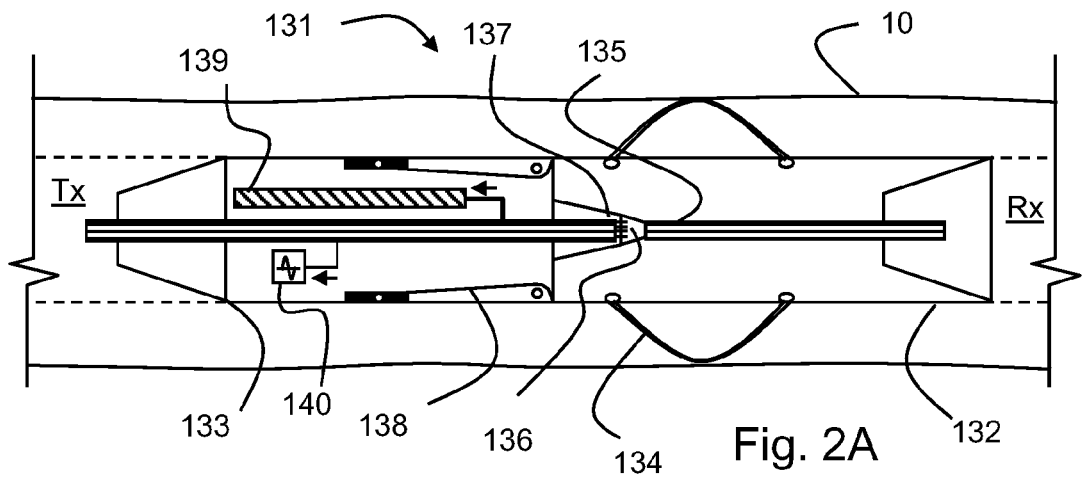
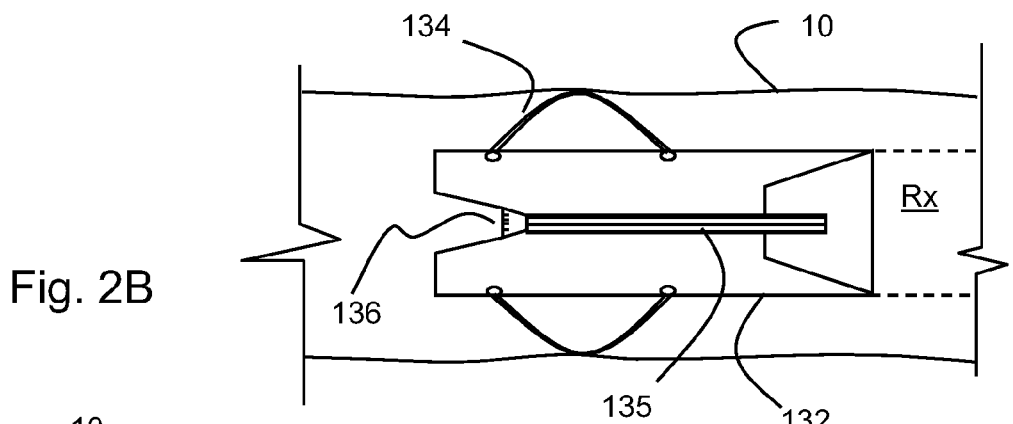
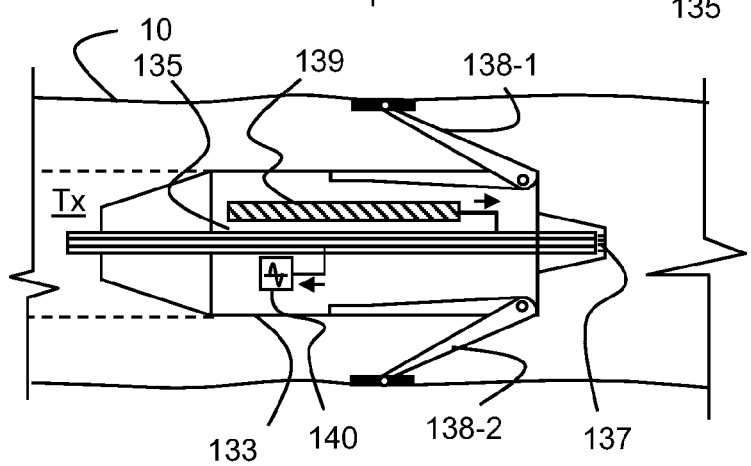

SINGLE WELL RESERVOIR CHARACTERIZATION APPARATUS AND METHODS

FIELD OF THE INVENTION

This invention relates to apparatus and methods for characterizing parts of a reservoir surrounding a well using one or more transmitters and receivers located in the well.

BACKGROUND

Geologic formations defining a reservoir for the accumulation of hydrocarbons in the subsurface of the earth contain a network of interconnected paths and pores through which fluids can flow from the formation into a borehole and from the borehole into the formation. To determine the nature and behavior of the fluids in the network, knowledge of both the nature of the pore fluids and the porosity of the geologic formations is desired. With this information, efficient development and management of hydrocarbon reservoirs may be achieved.

For example, the electrical resistivity of geologic formations is a function of both porosity of the formations and resistivity of the fluids. Considering that hydrocarbons are electrically insulating and most formation water is saline and thereby electrically conductive, resistivity measurements provide valuable data to infer the amount of water present in hydrocarbon reservoirs in geologic formations. Based on resistivity measurements it is further possible to monitor the changes in hydrocarbon content as production of the hydrocarbon proceeds and water content increases.

Details on methods and tools for determining resistivity of the formation in the space between two or more wells can be found for example in the two articles, "Crosshole electromagnetic tomography: A new technology for oil field characterization", The Leading Edge, March 1995, by Wilt et al. and "Crosshole electromagnetic tomography: System design considerations and field results", Society of Exploration Geophysics, Vol. 60, No. 3, 1995 by Wilt et al. Both sources describe the measurement of geologic formation resistivity employing low frequency electromagnetic (EM) systems with sources and receivers in two boreholes. Further methods and tools for performing EM measurements are described in a number of patents and patent applications including the co-owned U.S. Pat. No. 6,393,363 issued to Wilt and Nichols.

Similar measurements however performed from within a single well are less well known. Examples of such single-well EM surveys are published in: Alumbaugh, D. L., and Wilt, M. J., "A numerical sensitivity study of three dimensional imaging from a single borehole": Petrophysics, 42, 19-31 (2001) and M. Wilt and et al., "3D extended logging for geothermal resources: Field trials with the Geo-Bilt system", PROCEEDINGS, Twenty-Seventh Workshop on Geothermal Reservoir Engineering Stanford University, Stanford, Calif., Jan. 28-30, 2002. The latter publication suggests an extended tool design for single-well EM surveys.

More typical for single-well measurements are the known well logging methods. Named after the physical phenomenon exploited to perform the measurement, these characterizing methods for the well and its immediate surrounding are referred to as acoustic or sonic, resistivity and induction logging. All of these methods include one or more receivers and transmitters mounted on a logging tool and are typically limited to probing the close vicinity of the borehole. One of the factors limiting the reach or characterizing depth of these methods is the maximal available transmitter-receiver spacing.

To increase the reach of sonic or acoustic waves, Schlumberger has developed for example a wireline tool (referred to as the Borehole Acoustic Reflection Survey or BARS tool) that allows reservoir features such as reflectors and fractures to be imaged from a single borehole. The BARS tool builds on existing sonic logging technology with the distance between source and receiver section being made variable by the introduction into the tool of spacer sections, the length of which is determined by prior simulation of the reservoir features. Further information on the BARS tool can be found in co-owned U.S. Pat. No. 6,956,790 issued to J. Haldorsen and the literature found therein.

Though it is known that the depth of investigation of tools can be theoretically increased by increasing the distance between transmitters and receivers, the length of the logging tools cannot be arbitrarily increased to accommodate the larger distance between receivers and transmitters. Typically the maximum transmitter-receiver spacing on a tool in a single well is 10 m or less. In tools specifically designed to measure parameters deep in the reservoir, this distance may reach up to 35 m.

In a specific field of seismic exploration, the so-called Vertical Seismic Profiling (VSP) process, a number of tools have been proposed aiming at isolation sensors suspended into the borehole from noise traveling along it whilst maintaining at the same time a good contact with the wall of the borehole. Examples of such tools can be found in U.S. Pat. No. 4,578,785 issued to V. Gelfand, U.S. Pat. No. 5,259,452 issued to C. Wittrisch, and U.S. Pat. No. 7,048,089 issued to P. West et al.

In view of the known art, it is seen as one object of the invention to improve and enhance single well logging tools and methods. It is seen as a particular object of the invention to increase the depth of investigation for known logging methods without increasing the length of the logging tool. It is seen as another object of the invention to improve existing methods and tools for single-well EM tomography.

SUMMARY OF INVENTION

According to a first aspect of the present invention, an apparatus for characterizing parts of a reservoir surrounding a borehole is provided. The apparatus includes at least one transmitter to emit a probing signal into the borehole and at least one receiver to receive a signal representing a response of the formation to the probing signal, with the distance separating the transmitter and the receiver being variable while suspended in the borehole without having to lift the tool out of borehole.

To enable the operator to select a wide-range and flexible transmitter-receiver spacing in the well during or between successive measurements, the apparatus preferably includes a stationary section designed to maintain a fixed position in the borehole during the measurements and a mobile section designed to change position within the borehole during or between the measurements with the stationary section and the mobile section being adapted to separate while being suspended in the borehole.

The measurements referred to are understood to include measurements of the response of the formation to signals originally emitted from a controlled source or transmitter or an array of controlled sources or transmitters by one or more receivers. Successive measurements are those performed during a single survey with the apparatus remaining in the borehole. Typical successive measurements include the measurements made with increasing or decreasing transmitter-receiver spacing between two measurements. Examples of such surveys are the logging methods referred to above, particularly the acoustic and EM-type surveys.

In order for the stationary section to maintain its position, it is preferably linked to an anchoring system. Such an anchoring system can be based for example on any device which is capable of pushing a non-slipping surface or element against the wall of the wellbore.

In a preferred embodiment of the invention, the apparatus includes a coupler with an upper and a lower part connected by a connector element capable of establishing a rigid connection when coupled and releasable to separate the upper and lower parts. In an even more preferred variant, the coupler can be operated repeatedly, thus being able to at least re-couple once after a separation, but preferably several times during a survey while remaining in the borehole.

It is seen as advantageous to combine the lower part of the coupler with the anchoring element referred to above, thus forming a unit which can be connected to the section of the apparatus designed to be the stationary section without requiring a significant modification to existing tool parts which carry sources and receivers. When equipped with standard connector at both ends, the coupler with the anchoring element can be designed as a sub for introduction into conventional tools strings for logging or characterizing operations. Hence with the use of such a coupler sub, source and receiver parts designed for conventional tools can be more easily reused in an apparatus and for methods in accordance with the present invention.

The coupler includes preferably signal and/or power lines adapted to feed through signals and/or power as transmitted from or to a surface location when the connector element is coupled. For that purpose the coupler can include a connector element made up of a wet connector and/or an inductive coupling element, which support signals and/or power transmission into and from the stationary part while the apparatus is in its coupled state.

In a further preferred embodiment of this aspect of the invention, the stationary section includes a power storage to provide power to power consuming elements of the stationary section during phases in which it is separated from the mobile section. A power storage, which is preferably rechargeable through a transmission line when the two sections are re-connected, can supply for example the transmitters with the power required to emit a strong signal into the surrounding formation. To limit the size of the power storage, it is generally preferred to mount the less power consuming part of the transmitter-receiver pair onto the stationary section.

According to a further aspect, the invention provides a method for characterizing parts of a reservoir surrounding a borehole, including the steps of lowering at least one transmitter to emit a probing signal into the borehole and at least one receiver to receive a signal representing a response of the reservoir to the probing signal, wherein the distance separating the transmitter and the receiver is varied inside the borehole.

In a preferred variant, the method includes the steps of lowering into the borehole an apparatus with a stationary section designed to maintain a fixed position in the borehole during successive measurements and a mobile section designed to change position within the borehole during or between successive measurements and separating the stationary section and the mobile section while remaining suspended in the borehole.

The variant of the invention can include the further step of maintaining the stationary part in the fixed position in the borehole assumed prior to separating the stationary section and the mobile section until the stationary section and the mobile section are reconnected. This step can be performed for example by activating an anchoring element attached to the stationary part prior to separating the stationary section and the mobile section.

In a further variant of this aspect of the invention, the following steps are taken during a survey in a single borehole:
lowering the apparatus with the stationary section and the mobile section coupled into the borehole to a (first) station depth;
activating the anchor element to fix the stationary section at the (first) station depth;
decoupling the stationary section and the mobile section;
moving the mobile section relative to the stationary section while using the receiver to measure the response of the reservoir to signals emitted from the transmitter;
moving the mobile section towards the stationary section;
re-coupling the stationary section and the mobile section; and
moving the apparatus with the stationary section and the mobile section coupled to a next station depth or to the surface.

Further details, examples and aspects of the invention will be described below referring to the following drawings.

BRIEF DESCRIPTION OF THE FIGURES

FIG. 1 illustrates an example of the invention as part of a well characterizing or logging operation;

FIG. 2 are schematic drawings of parts of a tool in accordance with an example of the invention.

DETAILED DESCRIPTION

Figure 3A:
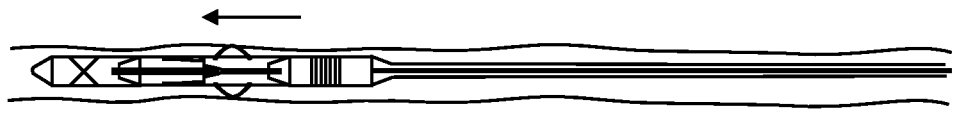
FIG. 3 illustrates steps of a method in accordance with an example of the invention.

FIG. 1 illustrates an example in accordance with the present invention. The figure shows a borehole 10 drilled into the formation 11. Located at surface location next to the entry point at the well site, a movable platform 12 is shown lowering a logging tool 13 into the borehole 10. As illustrated the tool 13 is shown with the lower stationary section Tx carrying in the present example transmitting devices and the upper mobile section Rx carrying receiver devices, both combined and as one tool string suspended from coiled tubing 121. The lower stationary tool section Tx and the upper mobile part Rx are joined by a coupler 131 to be described in more detail below. To lower the tool into the well, the coiled tubing 121 is reeled off a surface platform 12.

Using for example the EM configuration of the known Geo-Bilt system as described by Wilt et al. above, the transmitter and receivers can be designed as three component systems with antennas oriented in three spatial directions. The transmitter antennas are for example coincident, multi-turn coils wound around a common center with matched inductances, allowing them to be tuned with a single set of capacitors. The antennas are for example air-core coils wound around a machined frame made of a high temperature fiberglass. They can be 1 m long and the magnetic moment of all of the sources can be designed to be approximately 10 A-m$^2$. This setup provides sufficient field strength for operation at source-receiver offsets of up to 50 m.

For acoustic surveys the source can be any of the known types of seismic sources including explosive charges, perforation charges, air guns, implosive bottles, orbital vibrators, axial vibrators, pneumatic shakers, piezo-electric or PZT shakers, tube wave reflector/converters, axial spring-loaded hammer/anvil, and EM actuated hammer/anvil sources. The frequency range of the acoustic source can include typical seismic frequencies of 0 to 150 Hz or the higher frequencies of several hundred to twenty or thirty thousand Hz as applied typically in acoustic logging. In general it can be expected that the lower the frequency of the wave signal emitted from the source the lower its attenuation in the formation. Sources for other type of logging measurements can be monopole and dipole sources.

The primary source of power required to operate the transmitters and the receivers is located in the present example at the surface and power is transmitted using a wireline cable 122 inside the coiled tubing 121. The same cable is used to connect the logging tool 13 with a logging cabin 123 on the surface for the purpose of signal processing and/or storage. However depending on the application and the power requirements of the respective tool parts, it can be advantageous to mount the source or sources in the mobile section to provide its power directly from the surface.

The parts used for the operation as illustrated in FIG. 1 and as described so far are frequently applied in the industry and can be considered to be well known to those skilled in the art. It is further well known that, depending on the exact nature of the well operation and well design, the coiled tubing 121 can be replaced by many other conveyance tools to transfer the logging tool 13 into the borehole 10. Among these alternative conveyance tools are armored cable (or wireline) without or with downhole tractor and wired or non-wired drill string pipe as applied in Logging-While-Drilling (LWD) applications.

More detailed views of novel aspects of the tool and its operation modes are shown in the following figures.

Referring now to FIGS. 2A and 2B, the coupling element of the tool 13 of FIG. 1 is shown in a coupled and in a decoupled state, respectively. The coupler 131 includes two main parts 132, 133. The part which is deeper in the borehole is referred to as lower part 133 and the other as the upper part 132. In the example, the lower part 133 connects to the stationary section Tx, while the upper part 132 connects through the mobile section Rx to the coiled tubing 121 and hence to the surface 12.

In FIG. 2A the coupler 131 is shown in its connected state. The upper part 132 carries four symmetrically arranged bow springs (two are not shown) 134 which together act as a centralizer to maintain the tool in a central position within the well. Guided through the upper part 132 is a power and signal line 135. The line 135 is designed to transmit electrical and/or hydraulic power and signals through the coupler between the surface, the mobile section Rx and the stationary section Tx. Within the upper part 132 of the coupler 131, the line 135 terminates in a female connector 136.

The female connector 136 and its corresponding male connector 137 mounted on the lower part 133 of the coupler 131 are designed to act together as a wet connect element which allows the coupler 131 to decouple and reconnect without being removed from the borehole 10. An electrical and/or hydraulic connection is established when the mating parts of female connector 136 and its corresponding male connector 137 are brought into contact. This connection is typically referred to as wet connection because it is made within a fluid-filled environment, which is often conductive and thus challenges the reliability of the electrical connection. The coupler is designed to be sufficiently rigid to withstand the pulling and pushing forces exerted by the coiled tubing during the movement of the combined tool in the well.

The connect elements 136, 137 inside the coupler 131 can be based on known wet connector systems as applied in other fields of the oilfield industry, for example in the Tough Logging Conditions System (TLCS) by Schlumberger Technology Corporation, Houston, Tex., which allows an electrical connection to be made between the logging tool and the cable after the logging tool has been lowered to the desired depth in the well.

Included into the various possible implementations of such wet connects are those which use a mechanical latch to join the mating parts together and maintain the integrity of the joint during the movement of the tool in the well.

Mechanical and electromagnetic latches for downhole connectors have been disclosed for mechanical, magnetic, electrical, inductive, hydraulic and optical connections and are commercially available. As the exact nature of the wet connect and its latch mechanism is not critical for the present invention as long as the connection reliably connects and reconnects downhole with sufficient mechanical strength, reference can be made to the numerous publications on the subject of wet connectors, including U.S. Pat. No. 4,700,778 issued to Smith et al., U.S. Pat. No. 4,799,546 issued to Hensley et al., U.S. Pat. No. 5,058,683 issued to Godfrey et al., U.S. Pat. No. 5,967,816 issued to Sampa et al., U.S. Pat. No. 6,209,648 issued to Brockman et al., U.S. Pat. No. 6,439,932 issued to Ripolone, U.S. Pat. No. 6,510,899 issued to Sheiretov et al., U.S. Pat. No. 6,776,636 issued to Cameron et al. and published international patent applications WO-2001033032 and WO-2008024809.

Inductive coupling is used in other areas of the oilfield for example to transfer signals between stands of wired drill pipe as described for example in U.S. Pat. No. 6,866,306 issued to Boyle et al. and U.S. Pat. No. 7,116,199 issued to Hall et. al. Releasable couplers can also be based on the use of movable magnets coupling or releasing a magnetic surface depending on their (controllable) orientation.

Once the logging tool 13 is positioned at a desired location in the well, the coupler 131 is decoupled as shown in FIG. 2B, thus splitting into its upper part 132 and lower part 133 and effectively separating the tool 13 into its stationary section Tx and its mobile section Rx. At this stage, an anchor element 138 is activated which immobilizes lower part 133 and the stationary section Tx in the wellbore. In the example, the anchor element is designed to maintain at least the lower part 133 of the coupler 131 in a central position thereby keeping both halves 136, 137 of the connect element aligned inside the wellbore.

There are numerous anchoring methods and tools known, which given the benefit of this disclosure, can be adapted to anchor the source part within the well. The anchoring system used in the example of FIGS. 2A and 2B include arms 138-1, 138-2 which are forced against the wall of the borehole by either mechanically, hydraulically or electromagnetic force. The number of arms can range from 1 to 8. Other known anchor systems include re-inflatable packers, which include a surface forced against the wall of the borehole when fluid is injected into the packer. An anchoring effect can also be achieved by designing the housing of the lower section of the coupling part with pivot points such that when the housing folds around the pivot points, it forces the device against opposite sides of the wall of wellbore and so wedging it into a fixed position.

These known anchor systems are used in fields such as wellbore completion, sidekick drilling, well perforation guns, and Vertical Seismic Profiling or VSP. Examples can be found in U.S. Pat. No. 7,331,386 issued to Kanayama et al., U.S. Pat. No. 6,179,055 issued to Sallwasser et al. describing a downhole tractor system, elements of which can be adapted to form an anchor system, U.S. Pat. No. 6,315,043 issued to Farrant et al., published U.S. patent application 2007/0181298 and other published documents.

The upper part 132 of the coupler 131 can be equipped with a centralizing or stand-off system adapted to align it with the lower part to facilitate the re-connection coupler. Such a centralizing or stand-off system can includes elastic elements such as the bow-spring centralizers 134 shown or essentially rigid elements with friction resistant surfaces. It is important that the centralizing or stand-off system does not impede the movement of the mobile section in the wellbore, as it moves during a survey within the well while the stationary element remains at a fixed position in the borehole 10.

It is worth noting however that the parts of the couplers can be aligned for re-coupling at positions others than along the central axis of the well. By arranging for example both parts at the bottom of the well in case of a horizontal well the alignment can be along an off-centered axis of approach. Such an alignment along the bottom may require an off-centered anchoring system as can be provided by a single lever anchor.

The lower section further includes a power storage element 139 to supply the lower part with the sources and the anchoring system with electrical and/or hydraulic power while upper and lower part remain decoupled in the well. The battery element can be recharged when the upper and low part are coupled.

Also supported by the battery is a clock system 140, which feeds a clock signal to the source controller. The clock signal is required for instance when source emission and receivers measurements have to be synchronized to allow for the processing of the measured data. Such synchronization is for example used in electromagnetic (EM) or acoustic/seismic measurements.

An exemplary data acquisition sequence in accordance with the novel methods of the invention is illustrated in FIG. 3.

FIG. 3a shows the tool 13 run from the surface to a designated Total Depth (TD) with the mobile section Rx and the stationary section Tx coupled and the anchor mechanism retracted into a closed position. In this state, power and signal transmission from the surface can be transmitted between all parts of the tool.

Figure 3B:
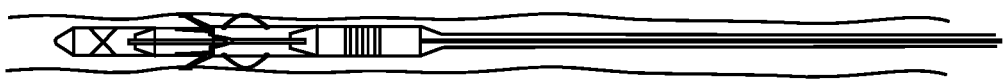

FIG. 3b shows the tool 13 with the anchor opened and thus fixing the position of the stationary section Tx.

Figure 3C:
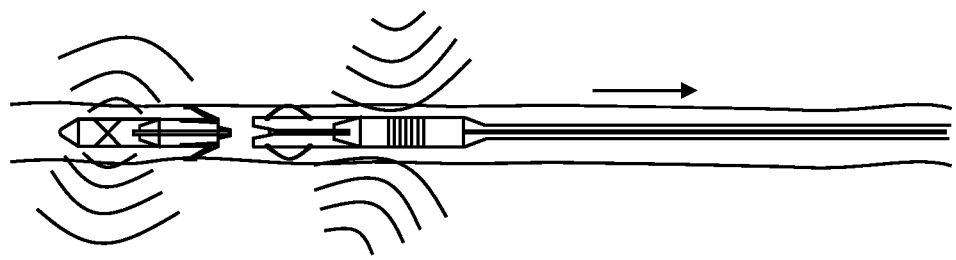

FIG. 3c shows the tool 13 with the coupler 131 being decoupled and the power and signal transmission between transmitter and receiver interrupted. The data acquisition starts in this decoupled state with the source Tx being activated and the receivers Rx listening to the response of the formation to the emitted signal at various depths levels.

During this stage of the operation, the distance between the transmitters in the stationary section Tx and the receivers in the mobile section Rx is varied either continuously or in successive steps. The separation achieved by this configuration is no longer determined by the length of the tool. Hence the distance between transmitters and receivers can easily exceed 10 m which is the practical limit of existing tools. With the new tool and methods source-receiver separation inside a single well can exceed 20 m or even 50 m or more with a relatively short tool length while tripping. In fact, the new design allows for transmitter-receiver separations which exceed the tool length when tripping in or out of the borehole.

During the period of separation, any power supply required can be provided by the internal storage element. Any synchronization required at this stage for the activation of the transmitter can rely on the internal clock element.

Figure 3D:
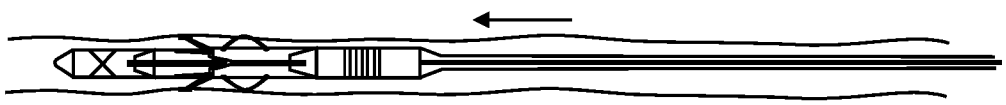

FIG. 3d shows the tool 13 while the mobile section Rx is pushed against the stationary section Tx to re-engage the connector elements and hence couple both sections of the tool. The anchoring mechanism can be released, and power, signals and stored data can be transmitted to and from the reconnected stationary section. At this stage, it is possible to synchronize the clock element and to recharge batteries, if required.

Figure 3E:
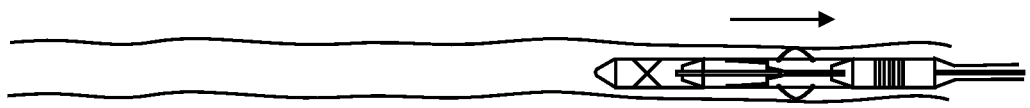

In FIG. 3e the combined tool is moved to another station or depth within the borehole to perform another stage of the logging survey or to be withdrawn completely from the well 10.

The example described uses a coupling element designed as a sub which can easily be introduced between source and receivers. This allows the receiver and source parts to be manufactured as separate units for use for example in cross-well surveys, where the source(s) and receiver(s) are located in different wells.

While the invention is described through the above exemplary embodiments, it will be understood by those of ordinary skill in the art that modification to and variation of the illustrated embodiments may be made without departing from the inventive concepts herein disclosed.

While it is regarded as advantageous for certain types of measurement, for example EM-type surveys, to mount the sources in the stationary section and the receivers in the mobile section, it is equally possible to mount the receivers in the stationary section and the sources in the mobile section. This alternative arrangement is preferred for example when an accurate knowledge of position of the receiver or receiver array is important to the type of measurement applied or when the power required to activate the transmitters exceeds the limits which can be provided by battery.

The stationary section and the mobile section may also remain coupled during the period of separation in the well by a thin umbilical to enable transmission of power and/or signals between the two sections. Though such an umbilical requires an additional space for a reel or bobbin mechanisms to be housed in either the mobile or the stationary section, it can alleviate the requirement for internal power storage or clock in the stationary section.

Surveys in accordance with the inventive apparatus and methods can be performed in horizontal or vertical sections of a borehole or even with one section of the apparatus in a horizontal and the other section in a vertical section of the borehole.

Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. An apparatus for characterizing parts of a reservoir surrounding a borehole, said apparatus comprising at least one transmitter to emit a probing signal and at least one receiver to receive a signal representing a response of said reservoir to said probing signal, with the distance separating said transmitter and said receiver being variable while said transmitter and said receiver are located in said borehole; and a stationary section, located between the at least one transmitter and the at least one receiver, designed to maintain a fixed position in the borehole during successive measurements and a mobile section, located between the at least one transmitter and the at least one receiver, designed to change position within said borehole during or between said successive measurements with said stationary section and said mobile section being adapted to decouple while being located in said borehole.

2. The apparatus of claim 1, wherein the stationary section is connected to an anchor element to maintain the fixed position in the borehole while said stationary section and the mobile section are decoupled.

3. The apparatus of claim 1 comprising a coupler with an upper and a lower part connected by a connector element capable of establishing a rigid connection when coupled and releasable to decouple said upper and lower parts wherein the upper part and the lower part are connected to one of the stationary section or the mobile section.

4. The apparatus of claim 3 wherein the lower part of the coupler includes an anchor element to maintain said part and any other tool section connected to said part at the fixed position in the borehole when the connector element is released.

5. The apparatus of claim 4 wherein the coupler is designed as a sub to be mounted between the stationary section and the mobile section before introduction of said apparatus into the borehole.

6. The apparatus of claim 5 wherein the coupler includes signal and/or power lines adapted to feed through signals and/or power as transmitted from a surface location when the connector element is coupled.

7. The apparatus of claim 1 wherein the stationary section includes clock elements to maintain an essentially synchronized clock signal between said stationary section and the mobile section while decoupled and the distance between said mobile section and the stationary section is varied in the borehole.

8. The apparatus of claim 1 wherein the stationary section includes an electrical power source to supply electrical energy to said stationary section while separated from the mobile section.

9. The apparatus of claim 1 wherein the transmitter and the receiver are designed to transmit and receive electro-magnetic signals.

10. The apparatus of claim 1 wherein the transmitter and the receiver are designed to transmit and receive sonic or seismic signals.

11. The apparatus of claim 1 wherein the coupler comprises a plurality of bow springs.

12. A method for characterizing parts of a reservoir surrounding a borehole, said method comprising the steps of lowering into the borehole an apparatus comprising at least one transmitter to emit a probing signal and at least one receiver to receive a signal representing a response of said reservoir to said probing signal into said borehole, wherein the distance separating said transmitter and said receiver is varied while being located in said borehole; and the apparatus further comprising a stationary section, located between the at least one transmitter and the at least one receiver, designed to maintain a fixed position in said borehole during successive measurements and a mobile section, located between the at least one transmitter and the at least one receiver, designed to change position within said borehole during or between said successive measurements and, while remaining in said borehole, decoupling said stationary section and said mobile section.

13. The method of claim 12, further comprising the step of maintaining the stationary part in the fixed position in the borehole assumed prior to separating said stationary section and the mobile section until recoupling said stationary section and said mobile section.

14. The method of claim 12, further comprising the step of activating an anchoring element attached to the stationary section prior to separating said stationary section and the mobile section.

15. The method of claim 12, further comprising the steps of
lowering the apparatus with the stationary section and the mobile section coupled into the borehole to a station depth;
activating an anchor element to fix said stationary section at said station depth;
decoupling said stationary section and said mobile section;
moving said mobile section relative to said stationary section while using the receiver to measure the response of the reservoir to signals emitted by the transmitter;
moving said mobile section towards said stationary section;
re-coupling said stationary section and said mobile section; and
moving said apparatus with said stationary section and said mobile section coupled to a next station depth or to the surface.

* * * * *